United States Patent [19]
Milne et al.

[11] Patent Number: 6,157,310
[45] Date of Patent: Dec. 5, 2000

[54] MONITORING SYSTEM

[75] Inventors: Robert William Milne, West Lothian; Charles Jarvis Nicol, Glasgow, both of United Kingdom

[73] Assignee: Intelligent Applications Limited, United Kingdom

[21] Appl. No.: 09/396,678

[22] Filed: Sep. 10, 1999

Related U.S. Application Data

[63] Continuation of application No. PCT/GB98/00753, Mar. 13, 1998.

[30] Foreign Application Priority Data

Mar. 13, 1997 [GB] United Kingdom .................... 9705186

[51] Int. Cl.$^7$ .................................................. G08B 21/00
[52] U.S. Cl. .......................... 340/679; 340/522; 702/185; 702/187; 701/35
[58] Field of Search .................................... 340/679, 522, 340/525, 517, 519, 521; 702/58, 59, 182–187; 701/35

[56] References Cited

U.S. PATENT DOCUMENTS

| 4,060,716 | 11/1977 | Pekrul et al. ............................ 702/184 |
| 4,792,888 | 12/1988 | Agarwal et al. .......................... 700/83 |

(List continued on next page.)

FOREIGN PATENT DOCUMENTS

| 0643345 A1 | 3/1995 | European Pat. Off. . |
| 2698470 A1 | 5/1994 | France . |

(List continued on next page.)

OTHER PUBLICATIONS

Dr. Louise Trave–Massuyes & Dr. Robert Milne, Diagnosis of Dynamic Systems Based on Explicit And Implicit Behavioural Models: An Application to Gas Turbines in Esprit Project TIGER, Published in *Applied Artificial Intelligence Journal* vol. 10, No. 3—pp257–277 Taylor & Francis (Publishers) 1996.

Dr. Robert Milne & Dr. Charlie Nicol, Dr. Malik Ghallab, Dr. Louise Trave–Massuyes, Dr. Kouamana Bousson & Christope Dousson, Prof. Joseba Quevedo, Dr. Jose Aguilar & Dr. Antoni Guasch, TIGER: Real–Time Situation Assessment of Dynamic Systems, Published in *Intelligent Systems Engineering' Journal*, Autumn 1994—pp103–124.

(List continued on next page.)

*Primary Examiner*—Jeffery A. Hofsass
*Assistant Examiner*—Sihong Huang
*Attorney, Agent, or Firm*—Luedeka, Neely & Graham, P.C.

[57] ABSTRACT

The present invention provides a monitoring system (30) for monitoring operation of dynamic plant apparatus (10, 100). Electronic processing means (31, 32, 33) is provided for processing the electrical parameter signals provided by sensors (11–15) and is capable of thereby producing a plurality of different fault signals. Display means (34) is provided for displaying fault information to a user of the monitoring system (30), the display means (34) being controlled by the fault signals produced by the electronic processing means (31, 32, 33). The electronic processing means (31, 32, 33) compares the values of at least some of the measured parameter signals with limit values stored in memory by the electronic processing means (31, 32, 33) and when the comparison shows that the value of a measured parameter signal is outside the respective limit value the electronic processing means (31, 32, 33) produces a respective basic fault token signal. There are storage means with a plurality of different storage sites, each storage site having a plurality of storage locations for a different predetermined variety of basic fault token signals. When all storage locations of a storage site are filled by basic fault token signals then the electronic processing means (31, 32, 33) produces a high level fault signal, causing the display means (34) to display a fault message.

40 Claims, 4 Drawing Sheets

U.S. PATENT DOCUMENTS

| | | | |
|---|---|---|---|
| 5,206,816 | 4/1993 | Hill et al. | 702/56 |
| 5,255,208 | 10/1993 | Thakore et al. | 702/185 |
| 5,434,845 | 7/1995 | Miller | 370/252 |
| 5,552,711 | 9/1996 | Deegan et al. | 324/464 |
| 5,602,757 | 2/1997 | Haseley et al. | 702/56 |

FOREIGN PATENT DOCUMENTS

| | | |
|---|---|---|
| 3301743 A1 | 7/1984 | Germany . |
| 4338237 A1 | 5/1995 | Germany . |
| 2083258 | 3/1982 | United Kingdom . |
| 2125185 | 2/1984 | United Kingdom . |

OTHER PUBLICATIONS

Dr. Robert Milne, Continuous Expert Diagnosis: Is the Future So Far Away? Published in *Condition Monitor Newsletter*, No. 114, pp5–9, Elsevier Advanced Technology (Publishers).

Dr. Robert Milne, Continuous Expert Diagnosis: Is the Future So Far Away? Published in *Modern Power Systems Journal*. Vol. 15, No. 10, p19–22—Oct. 1995, Wilmington Publishing Ltd (Publishers).

Dr. Robert Milne & Dr. Charlie Nicol, Dr. Louise Trave-–Massuyes, Prof. Joseba Quevedo, TIGER: Knowledge Based Gas Turbine Condition Monitoring, Published in '*A1 Communications 9 Journal*', pp. 1–17. Published by IOS Press (1996).

Dr. Robert Milne & Dr. Charlie Nicol, Dr. Louise Trave-–Massuyes, Prof. Joseba Quevedo, TIGER: Knowledge Based Gas Turbine Condition Monitoring, Published in "*Applications and Innovations in Expert Systems III*", Proceedings of Expert Systems '95 Conference. pp23–43. Editors: A. Macintosh and C. Cooper. Published by SGES Publications.

FIG. 4.

DIAGNOSIS

The second stage nozzles have saturated.

FAULTS PRESENT LEADING TO THIS CONCLUSION

The current to the nozzle servo (TANZ) is too high.
The reference signal to the second stage nozzles (TSRNZ) is too high.
The actual position of the second stage nozzles (TSNZ) does not follow the reference (TSRNZ) within 30 seconds.

OTHER FAULTS PRESENT THAT ARE ACCOUNTED FOR BY THIS DIAGNOSIS

The compressor shaft speed (TNH) is too high.
The output shaft speed (TNL) does not follow the reference (TNR) within 60 seconds.

OTHER FAULTS PRESENT IN THE SAME AREA (2ND_STAGE_NOZ)

Vibration on bearing BB4 too high.

MONITORING SYSTEM

This application is a continuation of Ser. No. PCT/GB98/00753 filed Mar. 13, 1998.

The present invention relates to a monitoring system.

The present invention will be described with reference to a monitoring system used to monitor a gas turbine, but the invention should not be considered as limited to such an application. Indeed, the invention could be used to monitor the performance of many complex machines and/or processes, although it has particular relevance and application to the monitoring of the performance of gas turbines.

Gas turbines are used in many industrial plants. The maintenance costs of gas turbines can be quite high and it is therefore important to find ways of reducing these maintenance costs. In the past, routine preventative maintenance checks were used to minimise major problems by routine check of the performance of the gas turbine and the cure of minor problems. However, this can be improved by monitoring the turbine on a regular basis to establish when maintenance action needs to be performed based upon the actual condition of the gas turbine rather than on the fact that the gas turbine has operated for a defined number of operating hours. The difficulty in doing this is to provide a system which both takes the correct measurements from the gas turbine and which also can interpret the measurements in a manner which can alert a user of gas turbine failure and give an idea of the causes of the failure.

The present invention provides a monitoring system for monitoring operation of dynamic plant apparatus comprising:

a plurality of sensors measuring dynamically varying operating parameters of the monitored dynamic plant apparatus and for generating electrical parameter signals indicative of the measured operating parameters;

electronic processing means for processing the electrical parameter signals and which is capable of thereby producing a plurality of different fault signals each of which respectively indicates that the monitored dynamic plant apparatus has a respective one of a plurality of faults;

display means for displaying fault information to a user of the monitoring system, the display means being controlled by the fault signals produced by the electronic processing means;

wherein:

the electronic processing means compares the values of at least some of the measured parameter signals each with respective predefined limit values stored in memory by the electronic processing means and when the comparison shows that the value of a measured parameter signal is outside the respective limit value the electronic processing means produces a respective basic fault token signal, characterised in that:

the electronic processing means has storage means for storing electrical signals which operates in a clocked manner and stores the basic fault token signals;

the storage means has a plurality of different storage sites, each storage site having a plurality of storage locations for a different predetermined variety of basic fault token signals; and when all storage locations of a storage site are filled by basic fault token signals produced in a prespecified clocked interval then the electronic processing means produces a high level fault signal, each storage site having an associated high level fault signal, the high level fault signal causing the display means to display a fault message.

The present invention is advantageous in quickly providing to a user an indication of a fault and is also in providing a high level output based on a series of detected low level faults.

A preferred embodiment of the present invention will now be described with reference to the accompanying drawings in which:

FIG. 4 shows how a display of the monitoring apparatus will look when a fault is reported.

The enclosed diagrams and the description which follows will show how the monitoring system of the present invention is innovative in processing signals generated by sensors distributed throughout a gas turbine in order to produce output signals which indicate a smaller number of fault conditions. This will permit a user monitoring the gas turbine to rapidly assess the state of the gas turbine and its problems without having to himself consider each sensed signal independently. Indeed the monitoring system of the present invention will produce a fault message which can be read by an engineer using the monitoring system.

Figure 1:
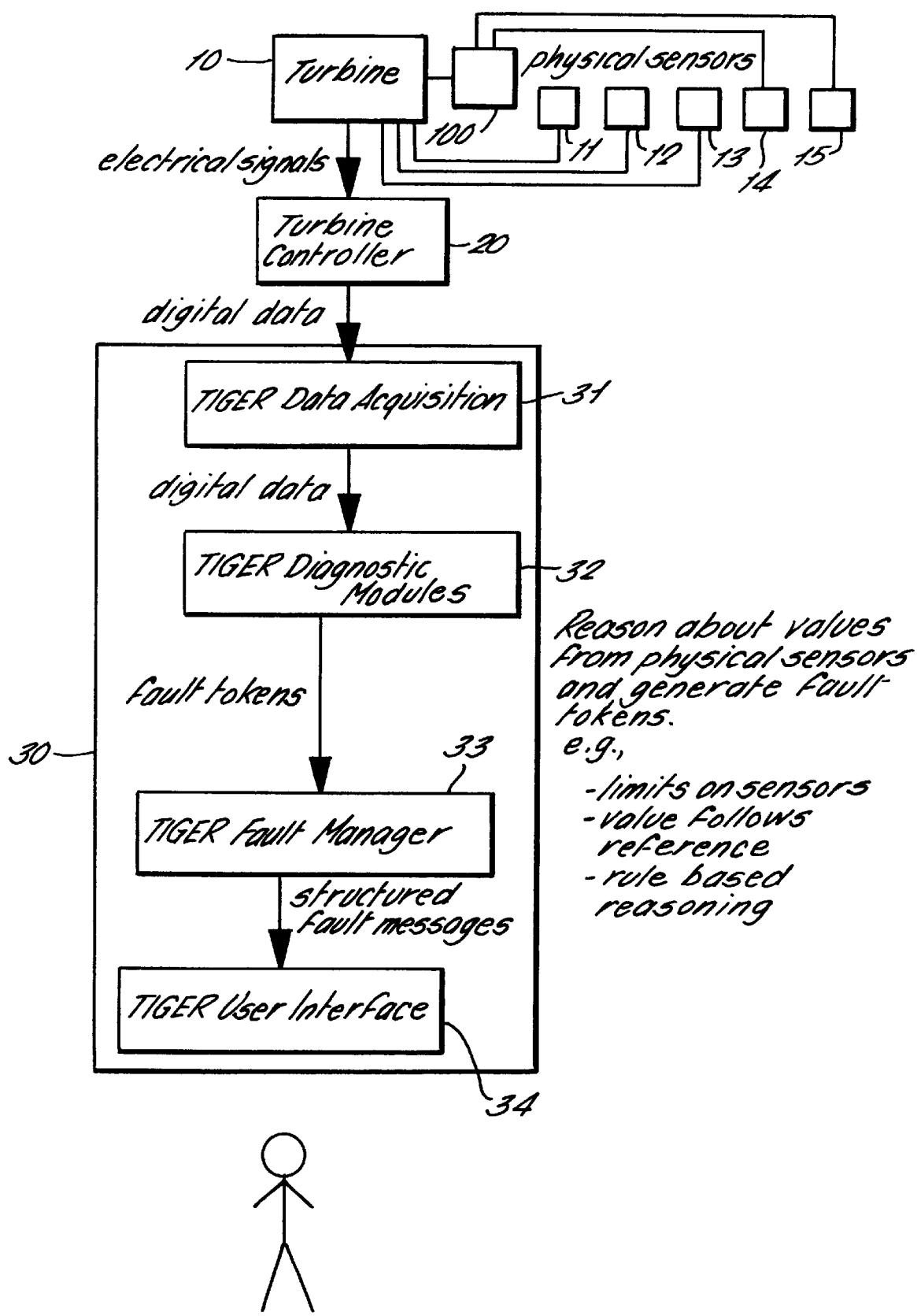
FIG. 1 is a schematic flow chart showing in broad outline the operation of the monitoring system of the invention.

In FIG. 1 the monitored gas turbine 10 is illustrated schematically. The gas turbine is connected to an electricity generator (dynamo) 100 to produce electrical power. Various sensors will be used to measure the dynamically varying parameters of operation of the turbine 10 and dynamically varying parameters of the electricity generator. Sensors 11, 12, 13, 14 and 15 are shown schematically in the Figure, connected to the turbine 10 to measure operating parameters of the turbine 10 or connected to the electricity generator 100. The sensors will measure the following parameters:

1. TANZ—second stage nozzle current
2. TSRNZ—second stage nozzle reference position
3. TSNZ—second stage nozzle actual position
4. TNH—compressor shaft actual speed
5. TNL—turbine output shaft actual speed
6. TNR—turbine output shaft reference speed
7. BB4—output of a vibration sensor located close to the second stage nozzles of the turbine
8. CTIM—maximum compressor inlet temperature (i.e. a measure of the maximum temperature of the air flow into the compressor portion of the gas turbine)
10. CTD—compressor discharge temperature (i.e. a measure of the temperature of the gases at the outlet of the compressor portion of the gas turbine)
11. TTWS1—temperature of a wheel space of the first stage turbine portion of the gas turbine
12. TTWS2—temperature of a wheel space of the second stage turbine portion of the gas turbine
13. TTWS3—temperature of a wheel space of the third stage turbine portion of the gas turbine
14. TTXD—exhaust temperature of the gas turbine
15. TGSD—electricity generator stator winding temperature
16. DTGGC—electricity generator cooling gas temperature on intake (cold)

17. DTGGH—electricity generator cooling gas temperature on output (hot)
18. BTGJ—bearing temperature
19. FTG—fuel gas temperature
20. FQG—fuel gas flow rate
21. FPRGOUT—gas ratio servo-valve demand signal
22. FSGR—speed ratio valve position signal
23. CPD—compressor discharge pressure
24. FD—flame detector signal
25. WQR—required flow rate of steam to the combustors
26. WQJ—actual flow of steam to the combustors
27. SPSJ—steam injection supply pressure
28. DWATT—sensed power output of electricity generator driven by the gas turbine
29. FSROUT—gas control valve position reference signal
30. FPG2—gas fuel intervalve pressure
31. L4—master protect digital signal The above-noted signals are provided both to a turbine control system 20 and are also provided to a monitoring system 30 according to the present invention which is shown in various modules in FIG. 1, namely a data acquisition module 31, a diagnostic module 32, a fault manager module 33, and a display module 34.

The signals mentioned above can initially be provided as analog or digital sensed signals for use by the turbine controller 20, but the data signals relayed from the turbine controller 20 to the monitoring system 30 will all be digital signals.

The monitoring system 30 acquires signals from the physical sensors 11 to 15 (in the illustrated example via the turbine controller 20) by use of its module 31. The digital signals are then relayed to a diagnostic module 32 which can generate basic fault token signals which are then sent to fault manager 33. The fault manager module 33 then processes the basic fault token signals to produce high level fault token signals which are relayed to the display means 34 for display to the user of the monitoring system.

The fault manager 33 can generate, amongst others, a high level fault token signal NOZ(SAT) which will cause the display means 34 to display to the user a message indicating that the second stage nozzles of the turbine 10 have saturated.

The fault manager 33 produces the signal NOZ(SAT) when a "temporal bucket" of the fault manager 33 is full. The term "temporal bucket" will be used as a convenient 'shorthand' to describe a storage site (e.g. 40, see FIG. 2) within the memory of the fault manager 33 which has a number of locations for a plurality of basic fault token signals. In the case of generation of the high level fault signal NOZ(SAT) this signal is generated when three low level fault tokens are produced by the diagnostic module 32, these error signals being:

1. An error signal TANZ (N,H)—this shows the current TANZ supplied to a servo-motor for the second stage nozzle of the turbine has moved from a normal value (N) to a high value (H). The high value is determined by the diagnostic module 32 as a value that is too high by comparing the value of the sensed parameter signal with a predetermined value stored in memory by the monitoring system 30.
2. TSRNZ (N,H)—this shows that the reference signal (TSRNZ) supplies to the second stage nozzles has grown from the normal value (N) to a value which is too high (H). Again, this is determined by comparison of the sensed parameter TSRNZ with a predefined threshold value stored in memory.
3. FOLLOWS (TSNZ–TSRNZ) in 45—this basic fault token signal indicates that signal TSNZ representing the actual position of the second stage nozzle did not reach the value of the reference signal TSRNZ within 30 seconds of the change of the reference signal TSRNZ (in fact the basic fault token signal shows that the change took place over 45 seconds, which is a period longer than the threshold value of 30 seconds preprogrammed in the memory of the monitoring system 30).

Figure 2:
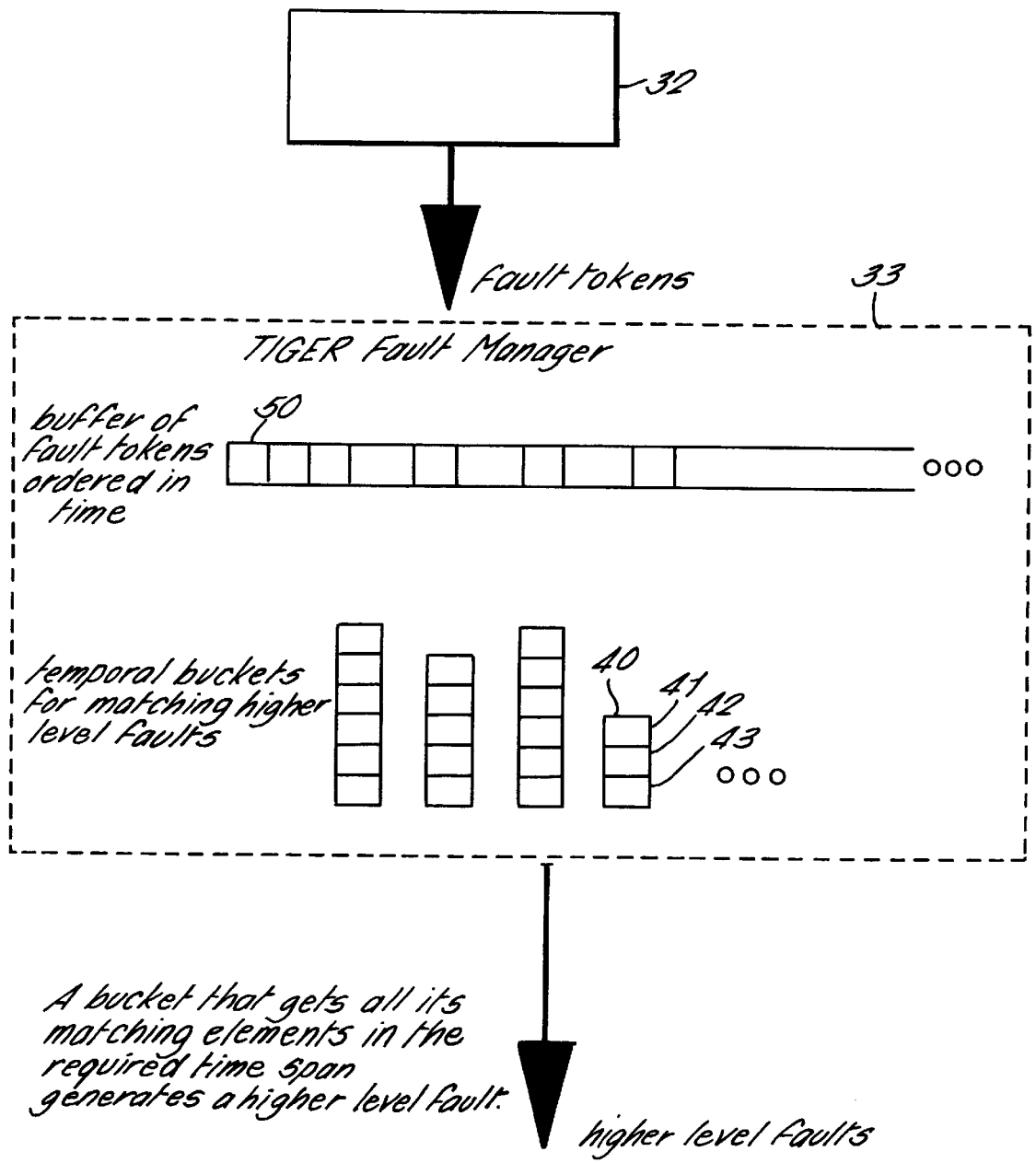
FIG. 2 is a schematic diagram giving a flow chart illustrating the operation of part of the monitoring system of the invention.

The temporal bucket 40 illustrated in FIG. 2 is a storage site which has three locations 41, 42 and 43, the first location 41 being a storage location for the TANZ (N,H) basic fault token signal, the location 42 being a storage space for the TSRNZ (N,H) basic fault token signal and the location 43 being the site for the FOLLOWS (TSNZ–TSRNZ) in 45 basic fault token signal. When the temporal bucket 40 is full then the high level fault token signal NOZ (SAT) is sent by the fault manager 33 to display means 34.

The basic fault token signals generated by the diagnostic module 32 are received by the fault manager 33 in a buffer 50 of fault token signals which are ordered in time. The fault manager 33 will operate in a clocked manner and will open each temporal bucket for receipt of basic fault error token signals for a specified clocked period, before erasing the temporal bucket then recommencing collection of basic fault token signals. Thus, for any higher level fault token signal to be generated, the respective temporal bucket in the fault manager 33 must be filled within a specified clocked period, i.e. a required time span.

Figure 3:
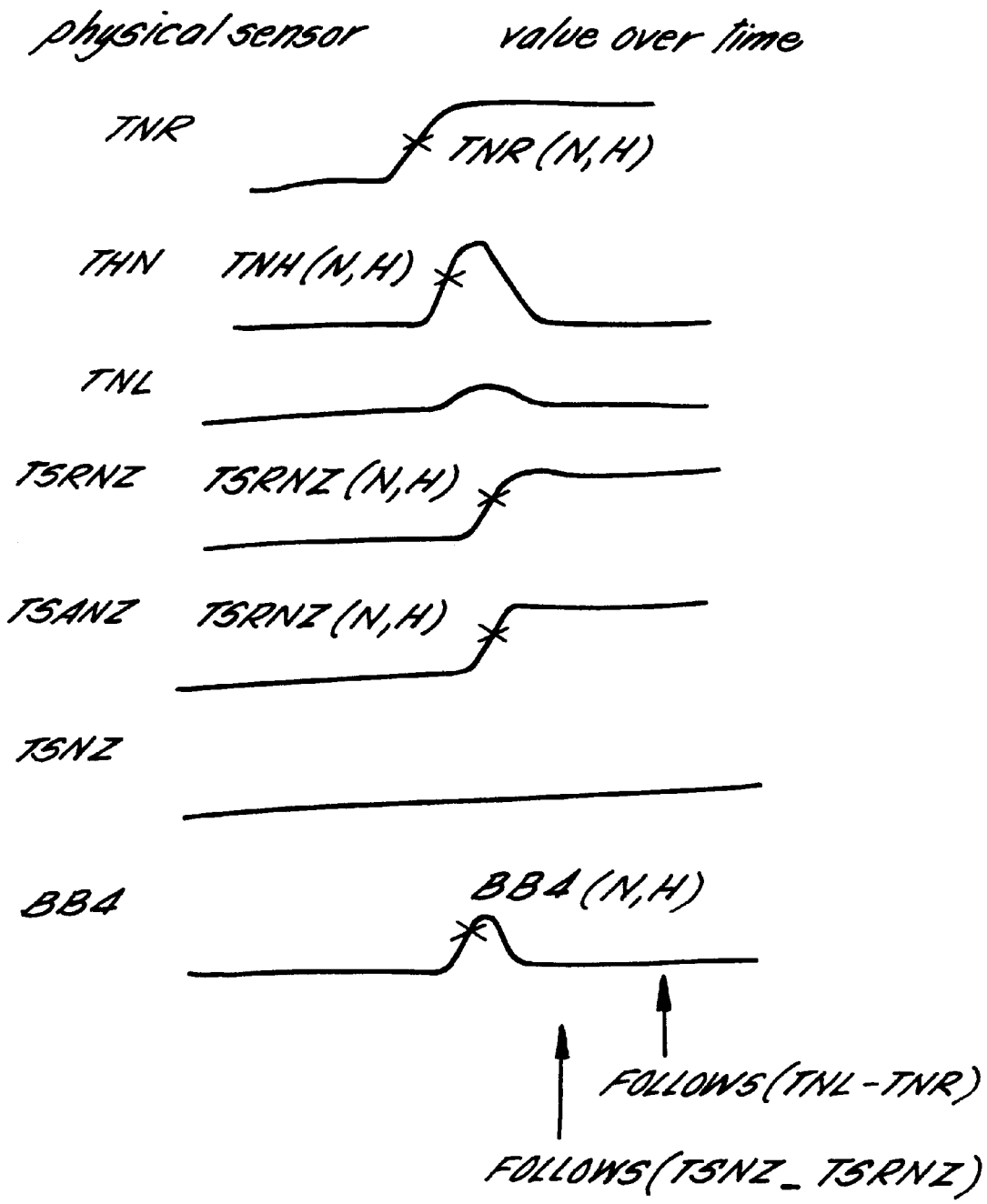
FIG. 3 is a diagram showing how various measured signals vary with time during a sensed failure.

In FIG. 3 there are shown graphs of how various sensed parameters vary in a manner which indicates saturation of the second stage nozzle.

The basic fault token message TANZ (N,H) is produced when a TANZ signal exceeds an upper limit of 5 milliamps. The diagnostic module will also have built in a dead band region of 0.1 milliamp, so that a further TANZ signal is not produced until the signal has moved 0.1 milliamps from its value when the basic fault token signal is first produced.

The basic fault token signal TSRNZ (N,H) signal is produced when the reference signal exceeds 5 milliamps and again there will be a dead band of 0.1 milliamps used for the signal.

The basic fault token signal TNH (N,H) will be produced when the actual speed of the compressor exceeds 5,120 r.p.m. and the diagnostic module will use a dead band of 5 r.p.m.

The BB4 (N,H) signal will be generated when the vibration sensor produces a current with a value above 2 milliamps, the diagnostic module using a dead band of 0.5 milliamps for the vibration signal.

The basic fault token signal FOLLOWS (TSNZ–TSRNZ) is generated when the second stage nozzle actual position signal TSNZ fails to follow the second stage nozzle reference signal TSRNZ within 30 seconds, a tolerance of 0.5 seconds being applied to a 30 second stop.

The basic fault token signal FOLLOWS (TNL–TNR) is generated when the signal TNL, the turbine output shaft actual speed fails to follow the signal TNR, the turbine output shaft reference speed, within 60 seconds, a tolerance of 10 seconds being used.

When the monitoring system produces a high level fault token signal then the user of the monitoring system not only receives information regarding the high level fault but also receives information regarding the basic fault tokens which led to the conclusion of the high level fault and also receives additional information regarding low level faults which can be accounted for by a diagnosis of the high level fault. An example of a diagnosis screen is shown in FIG. 4 and in this Figure it can be seen that nozzle saturation is noted as the fault and this was determined by the too high second stage nozzle current TANZ, the too high second stage nozzle reference position (N,H) and the fact that the second stage nozzle actual position failed to follow the second stage nozzle reference position within 30 seconds. This screen also shows that the too high compressor shaft actual speed and the failure of the turbine output shaft actual speed to follow the turbine shaft reference speed in 1 minute can be accounted by the saturation of the servo-motor for the actuator second stage nozzle.

In a preferred embodiment, the information is provided to the user in a windowed environment and the user can "click" on a piece of text to access Help pages which give information regarding the diagnosed faults and how to correct them.

The fact that some basic fault token signals can be accounted for by a higher fault diagnosis will be stored in the memory of the monitoring system, so that when a high level fault token signal is generated the monitoring system can then determine which other basic fault token signals are associated with the high level diagnosed fault.

The fault manager will continuously scan the buffer 70 to match and fill the temporal buckets defined in the fault manager 33. In the case of the temporal bucket for NOZ (SAT), the defined time interval of a bucket is 45 seconds. Once the fault manager has found that the temporal bucket is filled with the three signals TSRNZ (N,H), TSANZ (N,H) and FOLLOWS (TSNZ–TSRNZ) within 45 seconds then it will generate the high level fault token signal and will also scan the buffer for basic fault token signals present in the time span 1 minute 30 seconds around the 45 second time band to look for any basic fault error token signals which can be accounted for by the diagnosed high level fault.

The fault manager 33 can also look for other faults in the buffer which result from signals produced by sensors located in the same area as the diagnosed failed component, which are not directly accounted for by the failure. In the given example, a transition of the signal BB4 of the vibration sensor located close to the nozzles from a normal level to a high level has been noted by the basic fault token signal BB4 (N,H) and this basic fault token signal is noted in the display to the user (see FIG. 4).

In the fault manager 33 there will be a number of different temporal buckets, each producing a respective high level fault signal. For instance, one temporal bucket could be set up to generate a high level fault signal which indicates a suspected coil failure on the run gas speed ratio valve of the gas turbine. This high level fault token signal would be generated when in a specified time period the temporal bucket was filled with a signal indicating that the running gas pressure was too high (e.g. a value of 12.27 bar being above a limit value of 12.25 bar) and a second basic fault token signal was received in the temporal bucket indicating that the running gas speed ratio value current was too high (e.g. a value of 2.89 milliamps compared to a limit of 0.5 milliamps).

Various examples of basic fault token signals are as follows, some being given for arrangements in which the gas turbine is connected to an electricity generator and operating parameters of both the gas turbine and the electricity generator are measured:

1. a basic fault token signal would be generated when a change in position of the gas valve is indicated by a change in FPRGOUT without a corresponding change within a defined time limit in FQG, the sensed gas fuel flow (although all changes in FQG are not necessarily occasioned by a change in FPRGOUT);
2. a basic fault token signal would be generated when a change in compressor discharge temperature is indicated by a change in CTD, the compressor discharge temperature, without a corresponding change within a defined time limit in gas fuel flow indicated by FQG (although not all changes in gas fuel flow FQG are occasioned by a change in CTD);
3. a basic fault token signal would be generated when a change in sensed flame intensity indicated by the flame detector signal FD is not preceded within a defined time limit by a corresponding change in the gas control valve position reference signal FSROUT;
4. a basic fault token signal would be generated when a change in sensed power output DWATT of a generator connected to the gas turbine is not preceded within a defined time limit by a corresponding change in any of TTWS1, the first stage turbine wheel space temperature, TTWS2, the second stage turbine wheel space temperature, or TTWS3, the third stage turbine wheel space temperature, the signals TTWS1, TTWS2 and TTWS3 being provided by appropriately placed sensors;
5. a basic fault token signal would be generated when a change in the FQG signal, which indicates the flow rate of fuel gas to the gas turbine is not followed by a corresponding change in sensed power output DWATT;
6. a basic fault token signal would be generated when a change in sensed power output DWATT of a generator connected to the gas turbine is not preceded within a defined time limit by a corresponding change in the sensed flame intensity indicated by a change in FD;
7. a basic fault token signal would be generated when a change in sensed power output DWATT of a generator connected to the gas turbine is not preceded within a defined time limit by a corresponding change in exhaust temperature of the gas turbine as indicated by the signal TTXD;
8. a basic fault token signal would be generated when a change in the TGSD signal which indicates the stator winding temperature of a generator attached to the gas turbine is not preceded within a defined time limit by a change in the CTIM signal, which indicates the maximum temperature of the air drawn into the compressor of the gas turbine;
9. a basic fault token signal would be generated if the TGSD signal, which is a signal indicating temperature of the stator of a generator attached to the gas turbine, changes without a related change in the signal TTXD, which indicates exhaust temperature of the turbine, within a predefined time limit;
10. a basic fault token signal would be generated if the BTGJ signal, which indicates a bearing temperature of a generator attached to the gas turbine, changes without a corresponding preceding change in the DTGGC signal within a predefined time limit, the DTGGC signal indicating the temperature of the cooling gas entering the generator;
11. a basic fault token signal would be generated if DWATT, the electrical power output, is less than zero for more than 2 seconds;
12. a basic fault token signal would be generated if DWATT, the electrical power output, is less than zero for more than 5 seconds;

13. a basic fault token signal would be generated when a change in the signal WQJ, which indicates a change in the flow rate of steam to the combustors to control $NO_x$ in the exhaust emissions of the gas turbine, is not preceded within a defined time limit by a corresponding change in exhaust temperature if the gas turbine as indicated by the signal TTXD;

14. a basic fault token signal would be generated when a change in the signal SPSJ which indicates the injection pressure of a steam generator for generating steam to control $NO_x$ in the emissions of the gas turbine does not follow a corresponding change in the signal WQJ, which indicates a change in the flow rate of steam to the combustors within a predefined period;

15. a basic fault token signal would be generated if the signal CTD, which indicates compressor discharge temperature, changes without a corresponding change within a predefined time limit of the signal CTIM, the signal indicative of maximum compressor inlet temperature;

16. a basic fault token signal would be generated if the signal CTD, which indicates the temperature of gasses leaving the compressor part of the gas turbine, is not followed by a corresponding change in TTXD, the exhaust temperature of the gas turbine;

17. a basic fault token signal would be generated if the signal TTXD, which indicates exhaust temperature of the gas turbine, is not preceded by a corresponding change in FPG2, the fuel gas intervalve pressure;

18. a basic fault token signal would be generated if the L4 signal changes from 1 to 0.

The above noted basic fault token signals can be used to generate several high level fault tokens, by using appropriately structured temporal buckets. For instance, the following high level fault token signals could be produced;

A. A high level fault token signal could be produced which causes a fault message to be displayed indicating "mechanical fault in the generator", such high level fault token signal being produced when a temporal bucket is filled within a prespecified clocked interval by:

i) the basic fault token signal indicating a change in TGSD which is not preceded by a change in CTIM (see paragraph 8 on page 13 above); and ii) the basic fault token signal indicating an increase in BTGJ without a preceding change in DTGGC (see paragraph 10 on page 14 above).

B. A high level fault token signal could be produced which causes a fault message to be displayed indicating "steam supply problem", such high level fault token signal being produced when a temporal bucket is filled within a prespecified clocked interval by:

i) the basic fault token signal indicating a change in FD not preceded by a corresponding change in FSROUT (see paragraph 3 on page 12 above); and ii) the basic fault token signal indicating that a change in SPSJ is not followed by a corresponding change in WQJ (see paragraph 14 on page 15 above).

C. A high level fault token signal could be produced which causes a fault message to be displayed indicating "air flow disturbance in the turbine affecting power output", such high level fault token signal being produced when a temporal bucket has two storage locations filled within a prespecified clocked interval by either of:

i) the basic fault token signal indicating a change in DWATT which is not preceded by a corresponding change in FD (see paragraph 6, page 12 above); or ii) the basic fault token signal indicating a change in DWATT not preceded by a corresponding change in TTXD (see paragraph 7, page 12 above);

at the same time that a third storage location remains unfilled by:

iii) the basic fault token signal indicating a change in FQG without a corresponding change in DWATT (see paragraph 5, page 13 above).

D. A high level fault token signal could be produced which causes a fault message to be displayed indicating "turbine combustion problem", such high level fault token signal being produced when a temporal bucket has two storage locations filled within a prespecified clocked interval by:

i) the basic fault token signal indicating a change in FD which is not preceded by a corresponding change in FSROUT (see paragraph 3, page 12); and ii) the basic fault token signal indicating a change in TTXD not preceded by a change in FPG2 (see paragraph 17, page 15).

E. A high level fault token signal could be produced which causes a fault message to be displayed indicating "temperature change in the compressor, possible on line wash detected", such high level fault token signal being produced when a temporal bucket is filled within a prespecified clocked interval by:

i) the basic fault token signal indicating a change in CTD without a corresponding change in CTIM (see paragraph 15, page 15 above); and ii) the basic fault token signal indicating a change in CTD without a corresponding change in TTXD (see paragraph 16, page 15 above).

F. A high level fault token signal could be produced which causes a fault message to be displayed indicating "minor REVERSE power", such high level fault token signal being produced when a temporal bucket is filled within a prespecified clocked interval of 2 seconds by:

i) the basic fault token signal indicating a change in L4 from 1 to 0 (see paragraph 16, page 15 above); and ii) the basic fault token signal indicating that DWATT is less than zero (see paragraph 17, page 15 above);

and indeed if DWATT remains less than zero for more than 5 seconds from the change in L4 then a second high level fault token signal triggers the message "major REVERSE power".

Whilst above only selected high level fault tokens have been described, it will be appreciated that there will be many temporal buckets in the fault diagnosis module 33 with many associated high level faults to be diagnosed, the monitoring system storing in memory for each high level fault diagnosis a series of related basic fault tokens which can be accounted for by the high level fault and also a list of sensors located in the same area as the component of the gas turbine noted as failed.

Whilst the specific embodiments above have been described with reference to use of the monitoring system to monitor a gas turbine, the monitoring system could be applied to any dynamic plant apparatus, the word 'dynamic' being used in this sense to indicate that the plant apparatus has parameters which vary throughout operation with time.

What is claimed is:

1. A monitoring system for monitoring operation of dynamic plant apparatus comprising:

a plurality of sensors measuring dynamically varying operating parameters of the monitored dynamic plant apparatus and for generating electrical parameter signals indicative of the measured operating parameters;

electronic processing means for processing the electrical parameter signals and which is capable of thereby producing a plurality of different fault signals each of which respectively indicates that the monitored dynamic plant apparatus has a respective one of a plurality of faults;

display means for displaying fault information to a user of the monitoring system, the display means being controlled by the fault signals produced by the electronic processing means;

wherein:

the electronic processing means compares the values of at least some of the measured parameter signals each with respective predefined limit values stored in memory by the electronic processing means and when the comparison shows that the value of a measured parameter signal is outside the respective limit value the electronic processing means produces a respective basic fault token signal, characterised in that:

the electronic processing means has storage means for storing electrical signals which operates in a clocked manner and stores the basic fault token signals;

the storage means has a plurality of different storage sites, each storage site having a plurality of storage locations for a different predetermined variety of basic fault token signals; and when all storage locations of a storage site are filled by basic fault token signals produced in a prespecified clocked interval then the electronic processing means produces a high level fault signal, each storage site having an associated high level fault signal, the high level fault signal causing the display means to display a fault message.

2. A monitoring system as claimed in claim 1 wherein the electronic processing means compares the value of a first measured parameter signal with the value of a second measured parameter signal and if after a change of the value of the first measured parameter signal there is not a related change of value of the second measured parameter signal within a predefined time period then the electronic processing means produces a basic fault token signal.

3. A monitoring system as claimed in claim 1 wherein on generation of the high level fault signal the display means displays information both regarding the high level fault and also the basic faults associated with the high level fault signal.

4. A monitoring system as claimed in claim 1 wherein the storage means stores predefined relationships between high level fault signals and basic fault token signals and when a high level fault signal is produced the monitoring system can determine which basic fault token signals, other than those in the storage site related to said high level fault signal, result from the detected high level fault, and information regarding such resulting basic faults is displayed by the display means.

5. A gas turbine having a monitoring system as claimed in claim 1.

6. A gas turbine as claimed in claim 5, wherein the measured dynamically varying operating parameters include:

a current to a servo-motor for a second stage nozzle of the gas turbine;

a desired position control signal for controlling position of the second stage nozzle;

a position feedback signal indicative of a measured position of the second stage nozzle;

a signal indicative of rotational speed of a compressor shaft of the gas turbine; and a signal indicative of rotational speed of an output shaft of the gas turbine.

7. A gas turbine as claimed in claim 6 wherein the monitoring system produces a first basic fault token signal when the current to the servo-motor exceeds a first predetermined threshold.

8. A gas turbine as claimed in claim 6 wherein the monitoring system produces a second basic fault token signal when the desired position control signal for controlling position of the second stage nozzle exceeds a second predefined threshold.

9. A gas turbine as claimed in claim 6 wherein the monitoring system produces a third basic fault token when the signal indicative of the rotational speed of the compressor shaft exceeds a third predefined threshold.

10. A gas turbine as claim in claim 6 wherein the monitoring system produces a fourth basic fault token signal when the measured position of the second stage nozzle fails to match the desired position of the second stage nozzle within a first predefined time period.

11. A gas turbine as claimed in claim 6 wherein the monitoring system produces a fifth basic fault token signal when a comparison of the signal indicative of the rotational speed of the output shaft with a turbine output shaft reference speed signal shows that the output shaft speed does not match the reference speed within a second predefined time period.

12. A gas turbine as claimed in claim 6 wherein the monitoring system produces:

a first basic fault token signal when the current to the servo-motor exceeds a first predefined threshold;

a second basic fault token signal when the desired position control signal for controlling position of the second stage nozzle exceeds a second predefined threshold;

a fourth basic fault token signal when the measured position of the second stage nozzle does not match the desired position of the second stage nozzle within a first predefined time period; and the monitoring system produces a high level fault token signal indicating failure of a servo-motor of the second stage nozzle when a storage site has three storage locations filled one each with the first, second and fourth basic fault token signals within a specified time period.

13. A gas turbine as claimed in claim 12 wherein the storage means stores predefined relationships between the high level fault signal indicating failure of the servo-motor of the second stage nozzle and:

a third basic fault token signal which is produced when the signal indicative of compressor shaft speed exceeds a specified threshold; and a fifth basic fault token signal which is produced when a comparison of the signal indicative of the rotational speed of the output shaft with a turbine output shaft reference speed signal indicates that the rotational speed of the output shaft does not match the reference speed within a second predefined time period; and wherein:

the monitoring system uses the predefined relations to record that production of the third and fifth basic fault token signal can be accounted for by a high level fault of saturation of the servo-motor of the second stage nozzle and when the high level fault token signal indicating failure of the servo-motor is produced the monitoring system displays on the display means a message detailing recent third and fifth basic fault token signals which have been produced and notes that such signals can be accounted for by the high level fault detected.

14. A gas turbine as claimed in claim 5 wherein the measured dynamically varying parameters include:
   a signal indicative of running gas pressure; and
   a signal indicative of current supplied to a running gas speed ratio valve.

15. A gas turbine as claimed in claim 14 wherein a sixth basic fault token signal is produced when the signal indicative of the running gas pressure exceeds a sixth predefined limit and a seventh basic fault token signal is produced when the signal indicative of current supplied to a running gas speed ratio valve exceeds a seventh predefined limit.

16. A gas turbine as claimed in claim 15 wherein a high level fault token signal indicating failure of a coil of running gas speed ratio valve is produced when a storage site has two storage locations filled one each with the sixth and seventh basic fault token signals in a specified period.

17. A gas turbine as claimed in claim 5 wherein a basic fault token signal is produced when a change in position of a gas fuel valve is sensed by a sensor without a corresponding change in gas fuel flow being sensed by another sensor within a predefined time period.

18. A gas turbine as claimed in claim 5 wherein a basic fault token signal is produced when a change in temperature of gas discharged from a compressor part of the gas turbine is sensed by a temperature sensor without a corresponding change in flow of fuel gas being sensed by a gas flow sensor within a predefined time period.

19. A gas turbine as claimed in claim 5 wherein a basic fault token signal is produced when a change in flame intensity is sensed by a flame detector sensor without a corresponding change in gas control valve position reference signal within a predefined time period.

20. A gas turbine as claimed in claim 5 wherein the gas turbine is connected to an electricity generator and drives the generator to produce electrical power, sensors are provided to sense dynamically varying operating parameters of the electricity generator and a basic fault token signal is produced when a change in power output of the electricity generator is sensed by a power sensor without a corresponding change in temperature of a wheel space of a turbine of the gas turbine being sensed by a temperature sensor within a predefined time period.

21. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in fuel gas flow rate is sensed by a flow rate sensor without a corresponding change in power output of the electricity generator being sensed by a power sensor within a predefined time period.

22. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in power output of the electricity generator is sensed by a power sensor without a corresponding change in flame intensity being sensed by a flame detector within a predefined time period.

23. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in power output of the electricity generator is sensed by a power sensor without a corresponding change in temperature of exhaust gasses of the gas turbine being sensed by a temperature sensor within a predefined time period.

24. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in temperature of a stator of the electricity generator is sensed without a corresponding change in the maximum temperature of air drawn into a compressor part of the gas turbine being sensed by a temperature sensor within a predefined time period.

25. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in temperature of a stator of the electricity generator is sensed by a temperature sensor without a corresponding change in temperature of the exhaust gasses of the gas turbine being sensed by another temperature sensor within a predefined time period.

26. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when a change in temperature of a bearing of the electricity generator is sensed by a temperature sensor without a corresponding change in temperature of cooling gas entering the electricity generator being sensed by another temperature sensor within a predefined time period.

27. A gas turbine as claimed in claim 5 wherein the gas turbine is connected to an electricity generator and drives the electricity generator to produce electrical power, sensors are provided to sense dynamically varying operating parameters of the electricity generator and a basic fault token signal is produced when the value of electrical power output of the generator as sensed by a power sensor is less than zero for more than a predefined time period.

28. A gas turbine as claimed in claim 5 wherein the gas turbine is provided with $NO_x$ control apparatus for controlling $NO_x$ emissions in exhaust gasses of the gas turbine by injecting steam into the exhaust gasses and sensors are provided to monitor dynamically varying operating parameters of the $NO_x$ control apparatus and a basic fault token signal is produced when a change in the rate of flow of steam to combustors of the gas turbine is sensed by a flow meter without a corresponding change in temperature of exhaust gasses of the gas turbine being sensed by a temperature sensor within a predefined time period.

29. A gas turbine as claimed in claim 5 wherein the gas turbine is provided with $NO_x$ control apparatus for controlling $NO_x$ emissions in exhaust gasses of the gas turbine by injecting steam into the exhaust gases and sensors are provided to monitor dynamically varying operating parameters of the $NO_x$ control apparatus and a basic fault token signal is produced when a change in injection pressure of a steam injector of the $NO_x$ control apparatus is sensed by a pressure sensor without a corresponding change in flow rate of steam to combustors of the gas turbine being sensed by a flow meter within a predefined time period.

30. A gas turbine as claimed in claim 5 wherein a basic fault token signal is produced when a change in temperature of gasses discharged by a compressor part of the gas turbine is sensed by a temperature sensor without a corresponding change in temperature of gasses at the inlet of the compressor part being sensed by another temperature sensor within a predefined time period.

31. A gas turbine as claimed in claim 5 wherein a basic fault token signal is produced when a change in temperature of compressed gas leaving a compressor part of the gas turbine is sensed by a temperature sensor without a corresponding change in temperature of exhaust gasses of the gas turbine being sensed by another temperature sensor within a predefined time period.

32. A gas turbine as claimed in claim 5 wherein a basic fault token signal is produced when a change in temperature of exhaust gasses of the gas turbine is sensed without a corresponding change in fuel gas intervalve pressure being sensed by a pressure sensor within a predefined time period.

33. A gas turbine as claimed in claim 5 wherein a basic fault token signal is produced when a digital master protection signal changes value from 1 to 0.

34. A gas turbine as claimed in claim 24 wherein the monitoring system produces a high level fault token signal indicating a mechanical fault in the electricity generator when a storage site has two storage location filled within a specified time period one each with the following basic fault token signals:
 the basic fault token signal indicating an increase in the bearing temperature without a corresponding change in the temperature of the cooling gas entering the electricity generator; and
 a basic fault token signal indicating a change in the stator temperature without a corresponding change in the maximum temperature of air drawn into the compressor part of the gas turbine.

35. A gas turbine as claimed in claim 19 wherein the monitoring system produces a high level fault token signal indicating a problem in steam supply to the combustors when a storage site has two storage locations filled within a specified time period one each with the following basic fault token signals:
 the basic fault token signal indicating a change in sensed flame intensity without a corresponding change in the gas control valve position reference signal; and
 a basic fault token signal indicating a change in the injection pressure of the steam without a corresponding change in flow rate of steam to the combustors of the gas turbine.

36. A gas turbine as claimed in claim 22 wherein the monitoring system produces a high level token signal indicating a problem of air flow disturbance in the gas turbine affecting the power output when a storage site has first and second storage locations filled in a specified time period one each with the following basic fault token signals:
 the basic fault token signal indicating a change in power output of the electricity generator is sensed without a corresponding change in flame intensity; and a basic fault token signal indicating a change in sensed power output without a corresponding change in the temperature of the exhaust gases; and
 when in the same specified time period a third storage location of the storage site remains unfilled by a basic fault token signal indicating that change in flow rate of fuel gas is not followed by a corresponding change in the sensed power output.

37. A gas turbine as claimed in claim 19 wherein the monitoring system produces a high level fault token signal indicating a problem with turbine combustors when a storage site has two storage locations filled within a specified time period one each with the following basic fault token signals:
 a basic fault token signal indicating a change in flame intensity without a corresponding change in gas control valve position reference signal; and
 a basic fault token signal indicating a change in temperature of the exhaust temperature of the gas turbine without a corresponding change in fuel gas intervalve pressure.

38. A gas turbine as claimed in claim 30 wherein the monitoring system produces a high level fault token signal indicating a problem with a temperature change in the compressor part of the gas turbine when a storage site has two storage locations filled within a specified time period one each with the following basic fault token signals:
 a basic fault token signal indicating a change in the temperature of the gasses discharged by the compressor part of the turbine without a corresponding change in temperature of the gasses at the inlet of the compressor part; and
 the basic fault token signal indicating a change in the temperature of the gasses discharged by the compressor part of the turbine without a corresponding change in the exhaust temperature of the gas turbine.

39. A gas turbine as claimed in claim 27 wherein the monitoring system produces a high level fault token signal indicating a problem with the generator being in reverse power mode when a storage site has two storage locations filled within a first specified time period one each with the following basic fault token signals:
 a basic fault token signal indicating a change in value of the digital master protection signal from 1 to 0; and
 a basic fault token signal indicating that the electrical power output of the electricity generator is less than zero.

40. A gas turbine as claimed in claim 39 wherein if the two storage locations remain filled for more than a second specified time period the monitoring system produces a high level fault token signal indicating a major fault.

* * * * *